United States Patent [19]

Bruggeling et al.

[11] Patent Number: 5,260,564
[45] Date of Patent: Nov. 9, 1993

[54] APPARATUS FOR DETECTING OBJECTS IN SHEET FORM WITH LIGHT REDIRECTING MEANS

[75] Inventors: Hendrik F. P. Bruggeling, Baarlo; Hendrik G. J. Rutten, Arcen, both of Netherlands

[73] Assignee: Oce-Nederland B.V., Venlo, Netherlands

[21] Appl. No.: 854,908

[22] Filed: Mar. 20, 1992

[30] Foreign Application Priority Data

Mar. 21, 1991 [NL] Netherlands ............ 9100498

[51] Int. Cl.⁵ .............................................. G01N 9/04
[52] U.S. Cl. ................................ 250/223 R; 250/561
[58] Field of Search ................. 250/561, 222.1, 221, 250/223 R, 216, 577

[56] References Cited

U.S. PATENT DOCUMENTS

| | | | |
|---|---|---|---|
| 1,848,874 | 3/1932 | Fitzgerald | 250/222.1 |
| 2,952,416 | 9/1960 | Sampson | 250/561 |
| 3,041,462 | 6/1962 | Ogle . | |
| 3,901,607 | 8/1975 | Kingsland . | |

FOREIGN PATENT DOCUMENTS 0058285 11/1981 European Pat. Off. .
4025739 2/1991 Fed. Rep. of Germany .
1356228 6/1974 United Kingdom .

OTHER PUBLICATIONS

*IBM Technical Disclosure Bulletin*, vol. 22, No. 4, Sep., 1979, New York, New York, U.S.
*Patent Abstracts of Japan*, vol. 12, No. 121 (M-686) (2968) Apr. 15, 1988 and JP-A 62-249851 (NEC Corp.) Oct. 30, 1987.

*Primary Examiner*—David C. Nelms
*Attorney, Agent, or Firm*—Birch, Stewart, Kolasch & Birch

[57] ABSTRACT

An apparatus for detecting a sheet in a conveying path, comprising a light source and a light receiver on one side of the conveying path and a light-reflecting element in the form of a prism on the other side of the conveying path for reflecting for the light receiver a beam of light emitted by the light source, wherein the prism has a first reflecting surface opposite the light source, a second reflecting surface opposite the light receiver and a third reflecting surface which deflects, in the direction of the second reflecting surface, the beam of light reflected by the first reflecting surface, so that the apparatus is less sensitive to deviations of the position of the prism with respect to the light source and the light receiver.

7 Claims, 3 Drawing Sheets

APPARATUS FOR DETECTING OBJECTS IN SHEET FORM WITH LIGHT REDIRECTING MEANS

BACKGROUND OF THE INVENTION

1. Field of the Invention

The present invention relates to a sheet detecting apparatus and more specifically to an apparatus for detecting an object in the form of a sheet moving past a flat conveying path.

2. Discussion of Related Art

In a known apparatus described in European Patent Application EP-A-0058285 a beam of light emitted by a light-emitting element is deflected by the first light-reflecting surface of a light-reflecting element and projected directly on to the second light-reflecting surface, which second light-reflecting surface deflects the beam of light incident thereon towards a light-sensitive element. This known apparatus is very sensitive to changes in the position of the light-reflecting element with respect to the light-emitting element and the light-sensitive element in a direction parallel to the conveying path for the sheet form object. In the known apparatus, in the event of such a change of position by the light-reflecting element, the distance between the beam of light projected on to the first light-reflecting surface and the beam of light reflected by the second light-reflecting surface changes by an amount which, given parallelism of the beams of light, is equivalent to twice the distance over which the light-reflecting element is displaced in the path direction. The result is a risk that the beam of light will fall completely or partially beside the light-sensitive element, so that even in the absence of an object in the form of a sheet interrupting the beam of light, the light sensitive element will react as if an object in the form of a sheet were present.

SUMMARY OF THE INVENTION

Objects of the Present Invention

Therefore, it is an object of the present invention to provide a sheet detection apparatus which will overcome the above-noted disadvantages.

It is a further object of the present invention to provide a sheet detection apparatus less sensitive to deviations of the position of the light-reflecting element with respect to a light-emitting element and a light-sensitive element.

The foregoing objects and others are accomplished in accordance with the present invention, generally speaking, by providing an apparatus comprising a light-sensitive element and a light-emitting element disposed next to one another on one side of a sheet conveying path and a light-reflecting element being disposed on the other side of the conveying path. The light-reflecting element comprises a first light-reflecting surface situated opposite the light-emitting element and a second light-reflecting surface situated opposite the light-sensitive element, which light-reflecting surfaces include an angle with one another and with the conveying path. The light-reflecting element comprises a third light-reflecting surface to deflect towards the second light-reflecting surface the beam of light reflected by the first light-reflecting surface. Consequently, the light-reflecting element does not have to be positioned accurately with respect to the light-emitting element and the light-sensitive element, without loss of proper operation of the apparatus.

In a first embodiment of an apparatus according to the present invention, the third light-reflecting surface is situated on that side of the second light-reflecting surface which faces the first light-reflecting surface and is parallel to the conveying path and, given an angle $\alpha$ included between the first light-reflecting surface and the second light-reflecting surface, the light-emitting element occupies a position in which a beam of light emitted by the light-emitting element meets the first light-reflecting surface along its optical axis at an angle less than $90° - \frac{1}{2}\alpha$. Consequently, the apparatus is compact and a considerable proportion of the emitted beam of light meets the light-sensitive element even in the event of inaccurate positioning of the optical elements with respect to one another.

In a second embodiment of an apparatus according to the present invention, the third light-reflecting surface is situated on that side of the second light-reflecting surface which is remote from the first light-reflecting surface and the difference between the acute angles included by the third light-reflecting surface and the second light-reflecting surface with the conveying path is equal to the acute angle formed by the first light-reflecting surface with the conveying path. Consequently, in comparison with the first embodiment, the apparatus is less sensitive to inaccurate positioning of the optical elements relatively to one another but, owing to the longer light path, a smaller proportion of the emitted beam of light meets the light-sensitive element.

In a preferred form of the first embodiment, the angle at which the optical axis of the beam of light emitted by the light-emitting element meets the first light-reflecting surface is $\frac{1}{2}\alpha$, $\alpha$ being less than 90°. In a preferred form of the second embodiment, the difference between the acute angles formed by the third light-reflecting surface and the second light-reflecting surface with the conveying path is 45°. Consequently, the apparatus according to the invention is also insensitive to any change in the distance between the light-reflecting element, on the one hand, and the light-emitting element and the light-sensitive element, on the other hand, and hence to deviations of their positions in a direction at right angles to the plane of the conveying path.

The first embodiment is most compact when, in its preferred form, the angle $\alpha$ is 60° and the third light-reflecting surface extends from an edge of the first light-reflecting surface to an edge of the second light-reflecting surface and has a length (b) of $\frac{2}{3}$ of the distance between the optical axis of the beam of light emitted by the light-emitting element and the parallel optical axis of the beam of light meeting the light-sensitive element. The light-reflecting element is then shorter in a direction perpendicular to the flat conveying path than when $\alpha$ is less than 60° and shorter in a direction parallel to the flat conveying path than when $\alpha$ is more than 60°.

BRIEF DESCRIPTION OF THE DRAWINGS

Other characteristics and advantages will be apparent from the following description, with reference to the accompanying drawings wherein.

Figure 1:
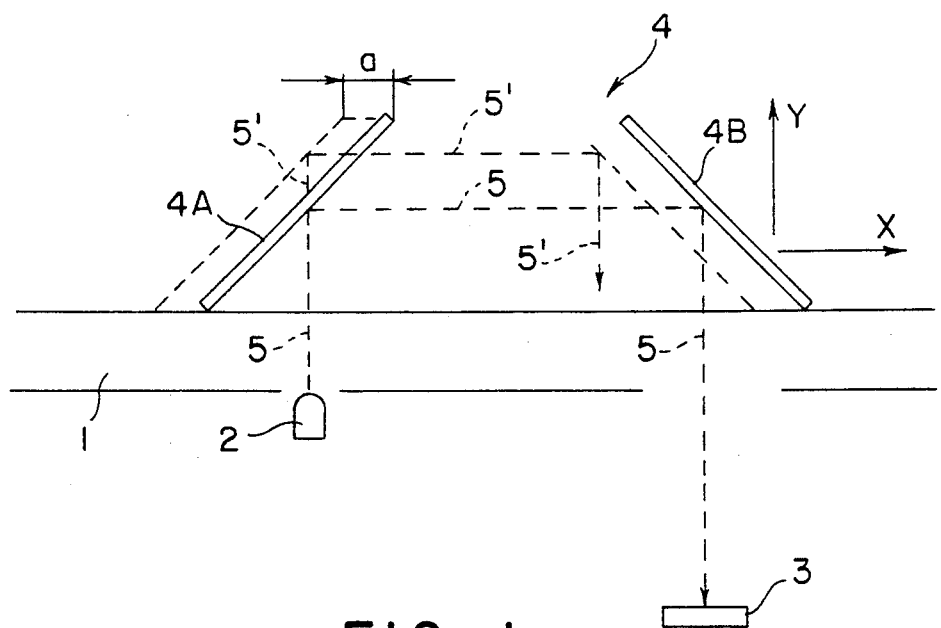
FIG. 1 is a diagrammatic cross-section of a prior-art apparatus.

In the apparatus according to the prior art as represented in FIG. 1, there is seen a conveying path 1 for an object in sheet form, e.g. a sheet of paper. A light source 2 and a light receiver 3 are disposed next to one another on one side of the conveying path 1. A light reflector 4 is disposed on the other side of the conveying path 1 and consists of two reflectors 4A and 4B disposed slant-wise with respect to the conveying path 1 and slant-wise with respect to one another. Reflector 4A serves to reflect a beam of light from light source 2 on to reflector 4B and reflector 4B serves to reflect a beam of light incident thereon to light receiver 3. The path normally taken by a beam of light in this known apparatus between the light source 2 and the light receiver 3 is denoted by 5.

In this known apparatus, when reflector 4 assumes a broken-line position differing from the normal position shown by the solid lines in FIG. 1, then the path of light 5 between the light source 2 and the light receiver 3 changes to the path of light 5′. It can readily be deduced that if the position of light reflector 4 is shifted in the direction indicated by X in FIG. 1 over a distance a, the beam of light reflected by reflector 4B shifts over a distance 2a. Thus, if the light reflector 4 is inaccurately positioned, the situation that rapidly occurs is that insufficient light meets the light receiver 3 and the latter incorrectly detects the presence of a sheet of paper in the conveying path 1.

Figure 2:
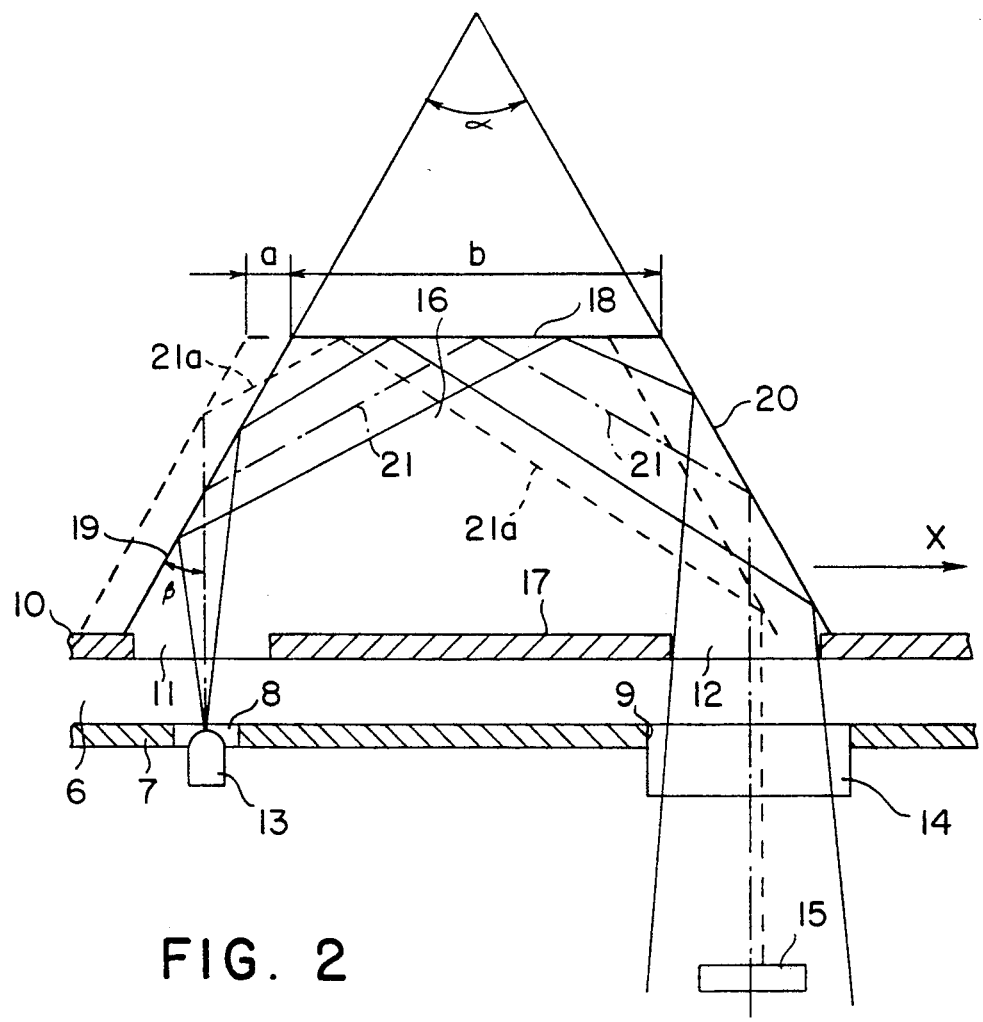
FIG. 2 is a diagrammatic cross-section of a first embodiment of an apparatus according to the present invention.

In the first embodiment of an apparatus according to the present invention, as represented in FIG. 2, a conveying path 6 extends horizontally. At the bottom the conveying path 6 is defined by a guide plate 7, in which apertures 8 and 9 are provided at a distance of 10.3 mm, and at the top by a guide plate 10 having apertures 11 and 12 situated opposite apertures 8 and 9, respectively. A light source or emitter 13 in the form of a light-emitting diode is disposed in aperture 8. A glass plate 14 is disposed in aperture 9 with a light receiver or detector 15 in the form of a photo-transistor therebeneath. A light reflector 16 in the form of a prism with a trapezoidal cross-section is disposed with its base 17 on the guide plate 10, projections formed on the base fitting in the apertures 11 and 12. The light-reflecting top surface 18 of the trapezoidal prism 16 extends parallel to the conveying path 6 and the light-reflecting sides 19 and 20 of the prism 16 form an intersecting angle ($\alpha$) when each side is extended, as in FIG. 2, and each light-reflecting side forms and angle of 60° with the base 17. The light-emitting element occupies a position in which a beam of light emitted therefrom meets along its optical axis the first light-reflecting surface at an angle ($\beta$) which is at least less than $90° - \frac{1}{2}\alpha$.

The path 21 is normally taken by a beam of light in the apparatus represented by FIG. 2, between the light source 13 and the light receiver 15. A beam of light following this path 21 meets the light reflectors 19, 18 and 20 successively at angles of 30°. with the reflector surface and is reflected at the same angle with the reflector surface. The light path 21 from light source 13 to light receiver 15 is made up of a distance of 6.52 mm from the light source 13 to reflector 19, a distance of 6.93 mm from the side reflector 19 to the top reflector 18, a distance of 6.93 mm from the top reflector 18 to the reflector 20, and a distance of 9.07 mm from reflector 20 to light receiver 15, so that the total light path has a length of 29.45 mm.

In the apparatus according to the present invention, as represented by FIG. 2, when the light reflector 16 occupies a position differing in the X-direction from the normal position represented by solid lines in FIG. 2, e.g. as a result of inaccurate positioning of the top plate 10 with the light reflector 16 fixed thereon and/or the bottom plate 7 with the light source 13 and light receiver 15 thereon, then light path 21 changes to light path 21a. The length of the light path does not change appreciably under these conditions. As will be apparent from FIG. 2, in the event of a shift of the light reflector 16 over a distance a in the direction indicated by X, the beam of light reflected by reflector 20 continues to coincide virtually with the beam of light in the non-shifted position of the light reflector 16.

The sensitivity of the devices described above was measured in a test rig for different positioning of the light source and light receiver, on the one hand, and the light reflector on the other hand. The measurements were made with the apparatus represented in FIG. 2, using, as the light reflector, prisms having a cross-section in the form of an equilateral trapezium, the sides of which respectively formed angles of 45° and 60° with the trapezium base line. The test rig with the 45° prism represents the prior art apparatus represented in FIG. 1 and the test rig with the 60° prism represents the apparatus according to the invention as represented in FIG. 2. The light-emitting diode used in the test rig was a GaAs infrared radiator of type SFH400. Of the power emitted by this radiator, 40% was emitted within a space angle of 6°, and this percentage falls entirely on the light receiver given ideal positioning of the prism.

Figure 3:
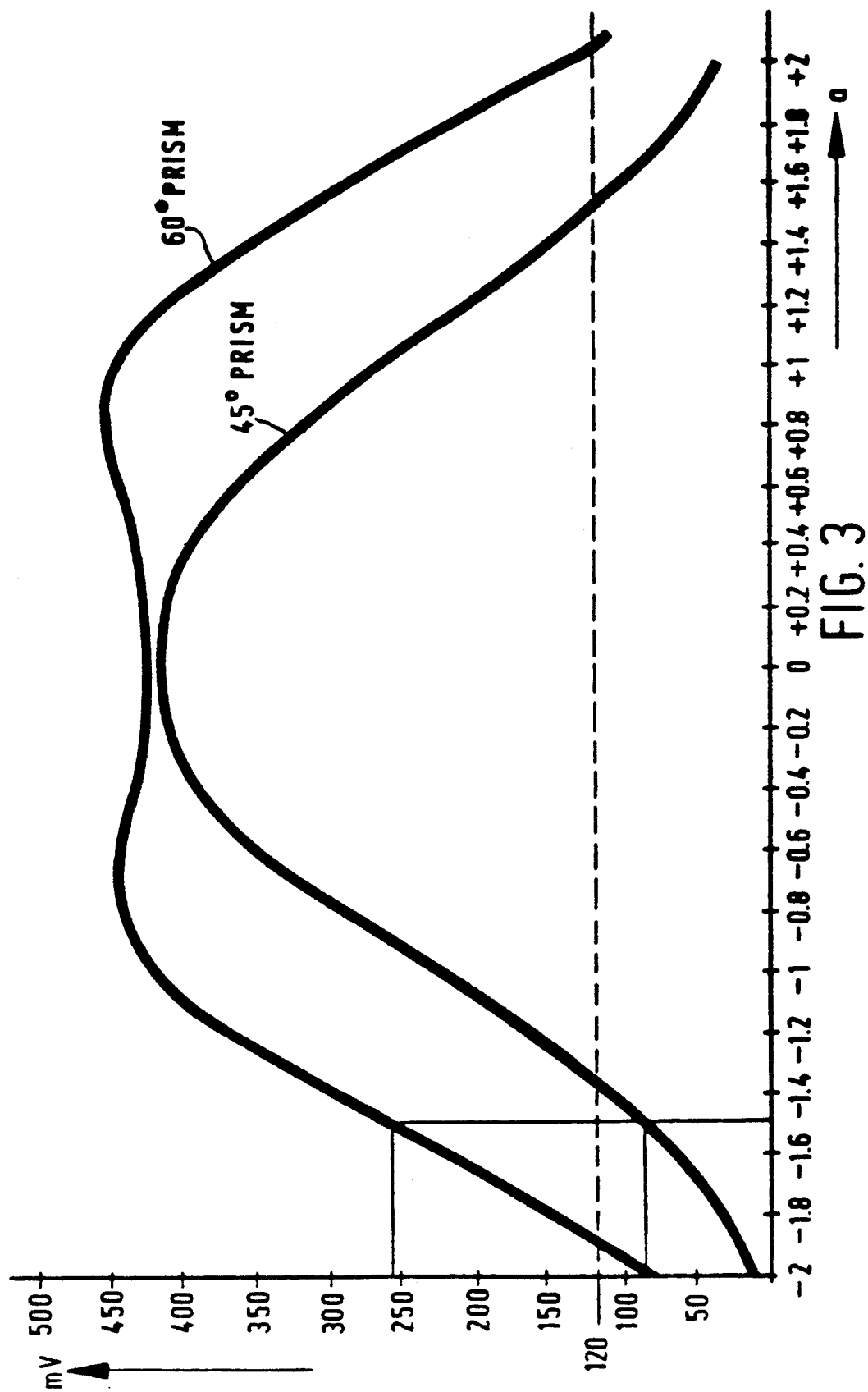
FIG. 3 is a graphic representation of the sensitivity of an apparatus according to the prior-art and according the apparatus represented in FIG. 2 for relative position changes of the elements thereof in a direction parallel to the conveying path.

The results of the measurements made with the test rig are shown graphically in FIG. 3. In this graph, the relative displacement of the light reflector, on the one hand, and the light source and light receiver on the other hand, are plotted horizontally, and the quantity of light received by the light receiver is plotted vertically, expressed as a voltage generated by the phototransistor as the light receiver, such voltage being a function of the quantity of light incident thereon. Given a relative displacement of 0, this voltage is approximately 420 mV, using either the 60° prism or the 45° prism.

In the apparatus of the present kind, the accuracy of the position of the optical components with respect to one another is determined by the practical position accuracy of parallel guide plates to each of which a part of the components is secured. A tolerance of ±1.5 mm in positioning accuracy of plating parts with respect to one another calculated in the plate plane is a conventional tolerance (tolerance in the X-direction). For the distance between plates, a conventional tolerance (tolerance in the Y-direction) is ±0.8 mm, and ±1° is a conventional angle tolerance between plates.

If there are conventional paper types in the conveying path between the guide plates, the voltage generated by the photo-transistor drops to below approximately 120 mV. If we take 120 mV as the critical value above which the voltage is required to remain in the absence of a sheet of paper in the conveying path, then it will be seen from FIG. 3 that with a permissible position deviation of ±1.5 mm in the X-direction, a voltage of approximately 250 mV is generated with a 60° prism, i.e. far above the critical value of 120 mV. This voltage then becomes 80 mV with the 45° prism, and hence far below the permissible critical value of 120 mV.

The sensitivities of the 45° and 60° prism were also determined by means of the test rig with different positioning in the Y-direction and in the direction of rotation, separately and in combination with one another. For tolerances in the Y-direction up to ±1 mm and for angle changes up to ±3°, the two prisms appear to be insensitive inasmuch as they do not cause the generated voltage to drop below 120 mV of themselves. On displacement of the light reflector in the Y-direction, the voltage drops nearly linearly from about 480 mV in the case of a position 1 mm closer to the light receiver than the ideal position, to about 370 mV in the case of the 60° prism and to about 350 mV in the case of the 45° prism in the case of a position 1 mm farther away from the light receiver than the ideal position. Given an uninterrupted light path, a minimal quantity of light which is close to the quantity of light reaching the light receiver when a sheet of paper is present in the light path, is only received with the 60° prism when the prism is displaced over the maximum permissible distances in the X and Y directions (respectively +1.5 mm to the right and 1 mm upwards with respect to the ideal position) and the prism is also inclined 1° to the left. This critical value is approached or exceeded respectively for practically every combination of extreme tolerance deviations with the 45° prism.

Figure 4:
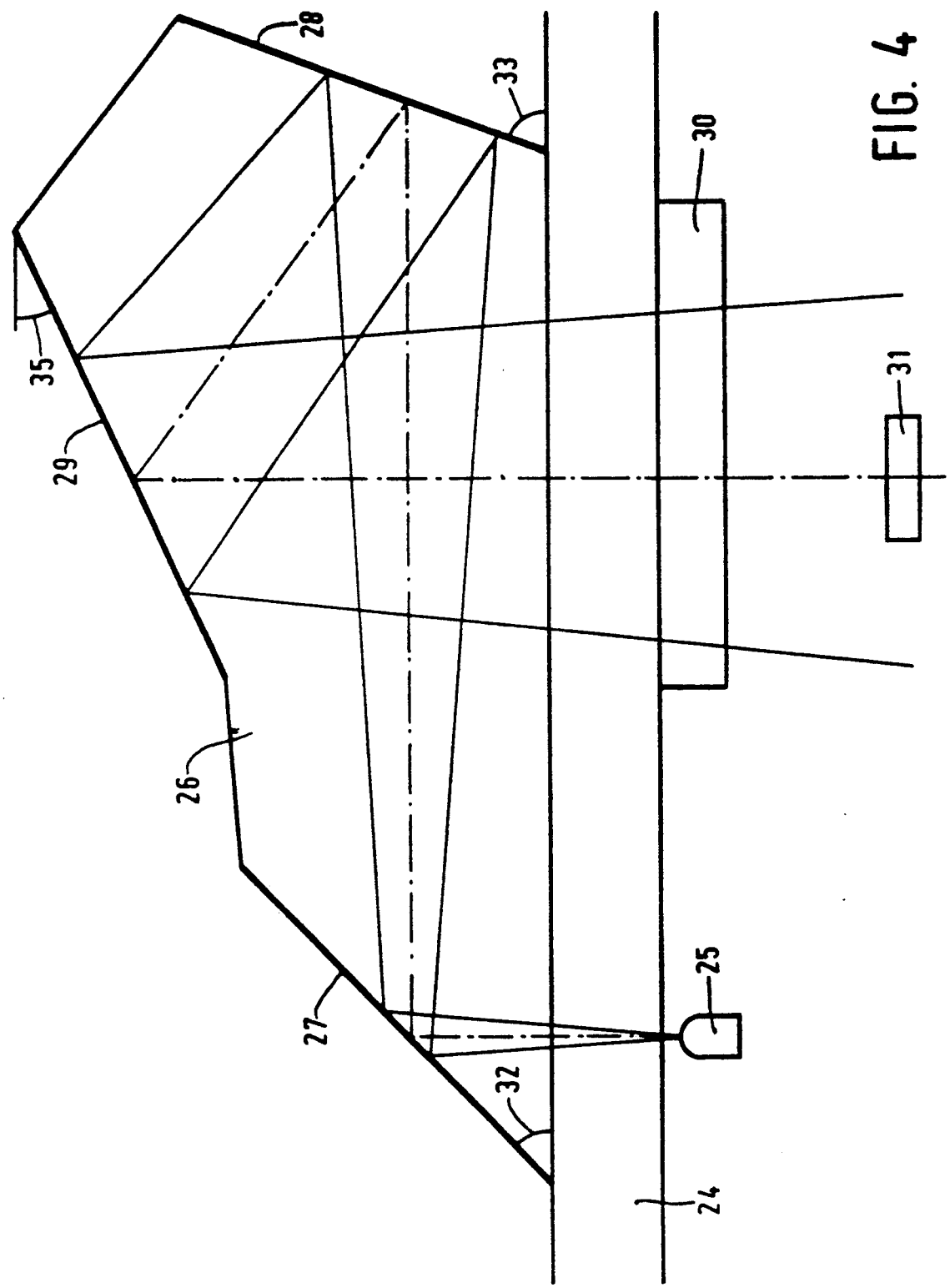
FIG. 4 is a diagrammatic cross-section of a second embodiment of an apparatus according to the present invention.

In the second embodiment of an apparatus according to the present invention, as represented in FIG. 4, a light source or emitter 25 and a light receiver or detector 31 behind glass plate 30 are disposed on one side of a conveying path 24 and a prism 26 on the other side of the conveying path 24. The prism 26 has a light-reflecting side surface 27 situated at an acute angle 32 of 45° to the conveying path 24 opposite the light source 25 and a light-reflecting side surface 29 situated at an angle 35 of 20° to the conveying path 24 opposite light receiver 31.

A light-reflecting side surface 28 forming an acute angle 33 of 70° to the conveying path 24 is situated on that side of the prism 26 which is opposite side surface 27. The optical axis of a beam of light emitted by light source 25 meets reflector surface 27 at an angle of 45° and is deflected at the same angle in the direction of reflector surface 28. Reflector 28 deflects the beam of light in the direction of reflector surface 29, which then deflects the beam of light in the direction of light receiver 31. Because of the longer path that a beam of light must cover in comparison with the apparatus represented in FIG. 2, a smaller proportion of the emitted beam of light meets the light receiver 31, and this results in a smaller signal-noise ratio. The sensitivity to inaccurate positioning of the prism 26, however, is found to be less than that of prism 16 in the apparatus represented in FIG. 2.

It is clear that the invention is not limited to the embodiments described and illustrated, but that numerous modifications can be made within the scope of the claims, more particularly with respect to the angles and mutual distances between the reflecting side surfaces.

We claim:

1. An apparatus for detecting an object in the form of a sheet moving past a flat conveying path, comprising a light-sensitive element and a light-emitting element disposed in proximity to one another on one side of said conveying path and a light-reflecting element disposed on an opposite side of said conveying path, said light-reflecting element comprising a first flat light-reflecting surface situated opposite said light-emitting element, a second flat light reflecting surface situated opposite said light-sensitive element and a third flat light-reflecting surface between said first and second light-reflecting surfaces, said first and second flat light-reflecting surfaces forming an angle $\alpha$ at an intersection therebetween, as well as forming respective angles between each of said first and second flat light-reflecting surfaces and said conveying path, so that said first flat light-reflecting surface deflects a beam of light emitted from said light-emitting element towards said third flat light-reflecting surface, said third flat light-reflecting surface deflects said beam of light reflected by said first flat light-reflecting surface towards said second flat light-reflecting surface and said second flat light-reflecting surface deflects said beam of light reflected by said third flat light-reflecting surface towards said light-sensitive element.

2. An apparatus according to claim 1, wherein said third light-reflecting surface is situated on that side of said second light-reflecting surface which faces said first light-reflecting surface, said third light-reflecting surface being parallel to said conveying path, and said light-emitting element occupies a position in which a beam of light emitted by said light-emitting element meets along its optical axis said first light-reflecting surface at an angle $\beta$ which is less than $90° - \frac{1}{2}\alpha$.

3. An apparatus according to claim 2, wherein said angle $\beta$ at which said optical axis of said beam of light emitted by said light-emitting element meets said first light-reflecting surface is $\frac{1}{2}\alpha$, $\alpha$ being less than 90°.

4. An apparatus according to claim 3, wherein said angle $\alpha$ is 60° and said third light-reflecting surface extends from a top edge of said first light-reflecting surface to a top edge of said second light-reflecting surface and has a length (b) of $\frac{1}{2}$ of a distance between the optical axis of said beam of light emitted by said light-emitting element and reflected by said first light-reflecting surface and a parallel optical axis of said beam of light reflected by said second flat light-reflecting surface towards said light detector.

5. An apparatus according to claim 1, wherein as seen in a plane parallel to said flat conveying path said third light-reflecting surface is situated intermediate between said first light-reflecting surface and said second light-reflecting surface and wherein the difference of an angle between said third light-reflecting surface and said conveying path and an angle between said second light-reflecting surface and said conveying path is equal to an angle between said first light-reflecting surface and said conveying path.

6. An apparatus according to claim 5, wherein said difference angle is 45°.

7. An apparatus as in any of claim 1-6, wherein said light-reflecting element comprises a prism.

* * * * *